R. A. WILLETT.
TIRE PROTECTOR.
APPLICATION FILED NOV. 30, 1906.
1,040,246.
Patented Oct. 1, 1912.
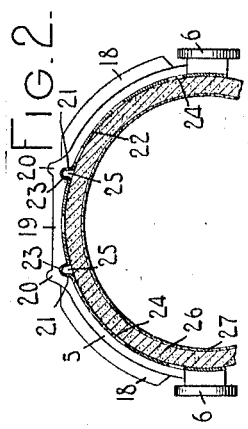
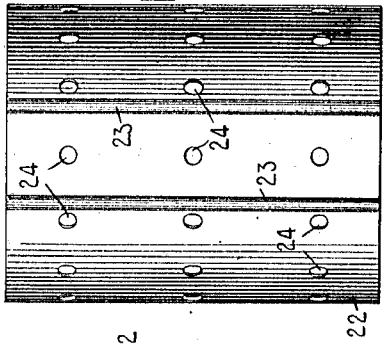
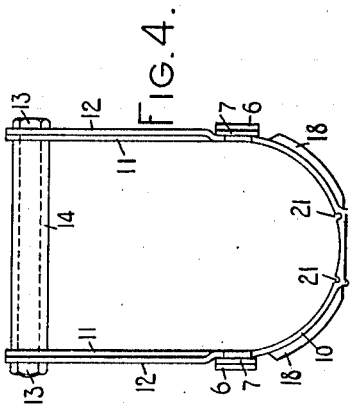
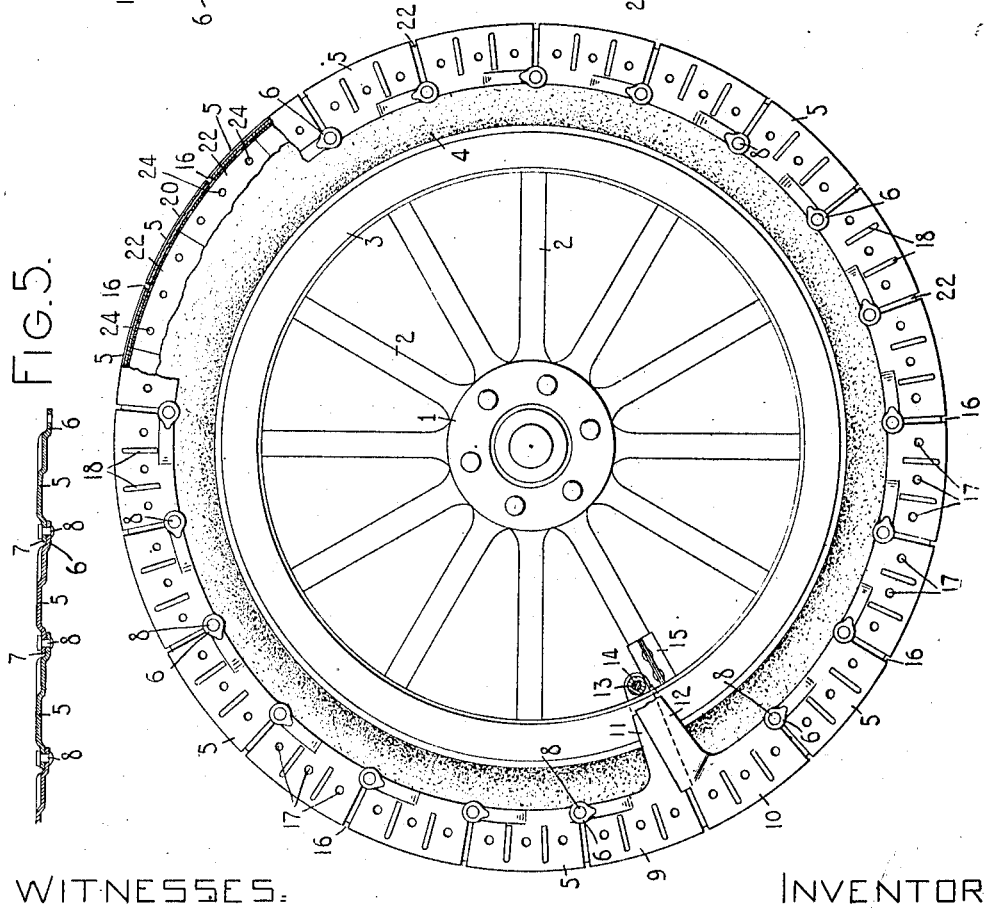
WITNESSES:
INVENTOR:
Robert A. Willett.
By Daniel A. Carpenter,
HIS ATTORNEY

UNITED STATES PATENT OFFICE.

ROBERT A. WILLETT, OF WARREN, OHIO, ASSIGNOR OF ONE-HALF TO EDWARD J. MAXWELL AND ONE-HALF TO GEORGE M. HUGHSON, BOTH OF LOS ANGELES, CALIFORNIA.

TIRE-PROTECTOR.

1,040,246. Specification of Letters Patent. Patented Oct. 1, 1912.

Application filed November 30, 1906. Serial No. 345,644.

*To all whom it may concern:*

Be it known that I, ROBERT A. WILLETT, a citizen of the United States, and a resident of Warren, in the county of Trumbull, and State of Ohio, have invented a certain new and useful Improvement in Tire-Protectors, of which the following is a full, clear, and exact description, reference being made to the accompanying drawings, forming part of this specification.

This invention relates to improvements in means for protecting pneumatic tires, such as are commonly used on the wheels of automobiles, and the invention consists of a tire-protector in which are embodied the features of construction, combinations and arrangements of parts, which are hereinafter described and specified in the claims.

On the accompanying sheet of drawings, on which like reference-numerals designate like parts in different views, Figure 1 is a side and partly sectional view of a wheel and of a tire-protector embodying the invention applied thereto; Fig. 2, a cross-section of the tire-protector, and of a part of the pneumatic tire; Fig. 3, a plan of one of the internal parts of the protector; Fig. 4, an end elevation of parts of the protector; and Fig. 5, a section of a fragment of the protector, illustrating details of the construction.

The wheel shown in Fig. 1 is of well known construction. It comprises the hub 1, spokes 2, rim 3 and pneumatic tire 4.

The particular protector which is shown in the drawings embodies the invention in its preferred form, yet certain features of this structure, namely the lining, the perforations and the air-ducts hereinafter described, are applicable to protectors differing from this in other respects to a considerable extent. This protector is composed of an outer series of sections pivotally secured together, there being spaces between their ends, and of an inner series of thin metal sections forming a lining which extends across the spaces mentioned and prevents the inner edges of the ends of the outer sections from chafing the tire. Each of the outer sections 5, which has the form shown in Figs. 1 and 2, is provided with pairs of ears 6 and 7, which are formed on it next to its ends and lateral edges, and each pair of ears 6 is pivoted by means of rivets 8 to the ears 7 of the next section, the inner faces of the ears 6 being in contact with the outer faces of the ears 7. All of the outer sections except two, which are designated by the numerals 9 and 10, are alike. The section 9 has at one end a pair of ears 6, 6 which are pivoted by rivets 8 to the ears 7 of the adjacent section 5, and at the other end of the section 9 are arms 11 extending from its sides and having the forms shown in Figs. 1 and 4. The section 10 has a pair of ears 7 at one end which are pivoted by rivets 8 to the ears 6 of the adjacent section 5, and on the section 10 at its other end are arms 12 extending from its sides and having the forms shown in Figs. 1 and 4. The arms 11, which are not quite so far apart as are the arms 12, fit between the latter arms. When the protector is in use the arms 11 and 12 are held together by a bolt 13 as they are shown in Figs. 1 and 4, there being an arm 11 and an arm 12 on each side of the tire and rim of the wheel, and the bolt passing through holes in the arms and being inside of the rim. A steel roller 14 is mounted on the bolt 13, and on a spoke of the wheel is a metal block 15 which is fast on the spoke. The roller 14 normally makes contact with the rim 4 and with the block 15. At the ends of each of the sections described and between it and the two proximate sections of the series are narrow spaces 16, and each of these sections contains perforations 17. These sections may also have on their sides projections or ribs 18 (Figs. 1 and 2), and on the parts 19 of the sections (Fig. 2) beads 20 extending lengthwise thereof may be formed. Each of these sections is internally grooved from end to end, as appears for example in Figs. 2 and 4, which show two grooves 21, but there might be a single groove or more than two grooves. The sections described may be formed from sheet-metal by means of a press and dies. The sections of the inner series forming the lining are all like the single section shown in Fig. 3. These sections 22 are formed from thin sheet-metal. This may be steel and the sections may be coated with copper to prevent them from rusting. Each has on it hollow beads which extend from end to end of the section, two beads 23 being shown since there are two grooves 21 in each of the outer sections. There might be a single bead on each section 22, or the number of beads might be greater than two should there be more than two grooves 21 in each of the outer sections. The sections 22 are perforated as appears by Fig. 3, but the number or arrangement of the holes 24 may differ from that shown. These sections fit in the outer sections as appears by Fig. 1, each section 22 crossing one of the spaces 16 and preferably extending from the middle or about the middle of one outer section to the middle or about the middle of another. The beads 23 of each inner section fit in the grooves 21 of the outer sections in which the inner section is confined, the inner sides of the beads forming air-ducts 25 which extend around the tire. The grooves 21 and beads 23 prevent the sections 22 from working sidewise out of their proper positions. The beads also prevent any of these sections from working past the end of another. The spaces or recesses 16 enable the outer edges of the ends of the sections of the outer series to so act on the ground as to prevent or tend to prevent the wheel from slipping, and these spaces also expose portions of the thin inner sections 22 to contact with the atmosphere and with water, sand, etc., which will absorb and dissipate some of the heat generated by the action of the wheel on the ground, and so help to keep the tire from getting dangerously hot. The perforations 17 and 24 and the air-ducts 25 also facilitate the action of air on the protector and tire in a manner calculated to reduce the effect of the heat, for the perforations promote the ingress of air to the interior of the protector and its egress therefrom, and the air-ducts promote the circulation of air between the tire and the protector.

While the tire illustrated herein is such as is commonly used on automobiles, it being composed of the thick and heavy outer member or case 26 and the thin inflatable tube 27 within the case (Fig. 2), probably the part 26 of a tire made to be used with this protector might safely be reduced in thickness and weight.

The protector described is applied to a wheel when the tire is deflated. The sections 9 and 10 may be drawn together by means for example of a device resembling a clamp, so as to enable the bolt 13 to be readily passed through the holes in the arms 11 and 12. The protector is prevented from creeping on the tire by the contact of the roller 14 with the block 15, and as the tire yields, when the sections 9 and 10 make contact with the ground, the roller is forced inward away from the rim of the wheel.

Having thus described my invention, what I claim as new and desire to secure by Letters Patent, is:

1. A tire-protector composed of a series of outer sections pivotally secured together, and a lining comprising a series of thin metal sections fitting together at their ends, each of the latter sections including parts which act on the adjacent sections of the series to prevent one section from slipping over another.

2. A tire-protector composed of a series of outer sections pivotally secured together, and a lining comprising a series of thin metal sections fitting together at their ends, each of the latter sections including outwardly extending projections which act on the adjacent sections of the series to prevent one section from slipping over another.

3. A tire-protector composed of a series of outer sections pivotally secured together, and a lining comprising a series of thin metal sections fitting together at their ends, each of the latter sections being internally grooved from end to end and each groove being even at its ends with grooves of the adjacent sections.

4. A tire-protector composed of a series of outer sections pivotally secured together, and a lining comprising a series of thin metal sections fitting together at their ends, each of the latter sections including an outwardly extending projection fitting in a recess in an outer section.

5. A tire-protector composed of a series of outer sections pivotally secured together, and a lining comprising a series of thin metal sections fitting together at their ends, each of the latter sections including an outwardly extending projection fitting in recesses in adjacent outer sections.

6. A tire-protector composed of a series of outer sections pivotally secured together, and a lining comprising a series of thin metal sections fitting together at their ends, each of the latter sections including outwardly extending projections fitting in recesses in adjacent outer sections.

7. A tire-protector composed of a series of sections pivotally secured together, and a thin metal lining which is unattached to said sections, the conformation of the lining to surfaces of said sections rendering the pressure of the tire operative to keep the lining properly confined in the sections when the protector is in use.

8. A tire-protector composed of a series of sections pivotally secured together, said sections containing recesses in their inner faces, and a thin metal lining including parts which fit in said recesses.

9. A tire-protector composed of a series of sections pivotally secured together, said sections containing grooves in their inner faces, and a thin metal lining having on it hollow beads which fit in said grooves and which form air-ducts extending around the tire when the protector is in use.

10. A tire-protector composed of a series of outer sections pivotally secured together, each of said sections being internally grooved from end to end, and a lining comprising a series of thin metal sections, each of the latter sections extending from the inner surface of one of the outer sections to that of another outer section and having on it a hollow bead fitting in the grooves in the outer sections.

11. A tire-protector composed of a series of outer sections pivotally secured together, each of said sections being perforated, and internally grooved from end to end, and a lining comprising a series of perforated metal sections, each of the latter sections extending from the inner surface of one of the outer sections to that of another outer section, and having on it a hollow bead fitting in the grooves of the outer sections.

ROBERT A. WILLETT.

In the presence of—
E. M. WELLS,
CHARLES E. SMITH.

Copies of this patent may be obtained for five cents each, by addressing the "Commissioner of Patents, Washington, D. C."